US005544904A

United States Patent [19]
Maher

[11] Patent Number: 5,544,904
[45] Date of Patent: Aug. 13, 1996

[54] CONVERTIBLE STROLLER

[75] Inventor: Jay A. Maher, Barrington, Ill.

[73] Assignee: Nelson-Whittaker, Ltd., Cary, Ill.

[21] Appl. No.: 399,158

[22] Filed: Mar. 2, 1995

[51] Int. Cl.$^6$ .................................................. B62B 3/02
[52] U.S. Cl. ..................... 280/47.35; 280/648; 280/47.4; 297/188.01
[58] Field of Search ..................... 297/188.01; 280/30, 280/642, 643, 644, 647, 648, 650, 47.18, 47.25, 47.26, 47.35, 47.38, 47.4

[56] References Cited

U.S. PATENT DOCUMENTS

| 2,438,829 | 3/1948 | Skolnik | 280/643 |
| 2,564,862 | 8/1951 | Stopinski | 297/188.01 X |
| 2,743,937 | 5/1956 | Ginsberg | 280/643 |
| 2,789,829 | 4/1957 | Parker | 280/47.18 X |
| 4,158,428 | 6/1979 | Bates | 280/304.1 X |
| 4,984,813 | 1/1991 | Takahashi et al. | 280/30 |
| 5,090,724 | 2/1992 | Fiore | 280/643 |
| 5,125,674 | 6/1992 | Manuszak | 280/30 |
| 5,213,360 | 5/1993 | Lin | 280/30 X |
| 5,265,892 | 11/1993 | Said | 280/30 |
| 5,290,049 | 3/1994 | Crisp | 280/30 |

Primary Examiner—Eric D. Culbreth
Assistant Examiner—Michael Mar
Attorney, Agent, or Firm—Lee, Mann, Smith, McWilliams, Sweeney & Ohlson

[57] ABSTRACT

A convertible stroller and shopping cart having a stroller portion and a shopping cart portion. The stroller portion includes a seat secured to a metal frame, and the shopping cart portion comprises a collapsible receptacle. The receptacle can be oriented in two orientations, a stowed orientation adjacent the seat and a deployed orientation over the seat. When the receptacle is deployed, it conforms to the seat, creating a shopping cart from the stroller.

7 Claims, 3 Drawing Sheets

CONVERTIBLE STROLLER

BACKGROUND OF THE INVENTION

This invention relates to shopping carts and childrens' strollers, and in particular to a stroller which may be easily and quickly converted from a stroller into a shopping cart when the stroller function is not needed.

An infant or a child is often restrained and moved about by its parents in a stroller. Strollers have been developed in many different forms and shapes, from relatively inexpensive collapsible strollers to fixed strollers of substantial construction which are provided by department stores, shopping malls and the like as a convenience for their customers during shopping.

Most strollers, however, are simply that—a stroller only. If the stroller is not needed for child care, it is simply not used. In a commercial setting, where ease and convenience are balanced against cost and durability, often a stroller which serves only that function is not economically justifiable.

Convertible strollers or chairs, which can be converted into a cart, have been developed in the past. For example, U.S. Pat. No. 5,265,892 is directed to a folding carrier arrangement which, among other things, can be converted into a chair. It does not retain its cart configuration when converted to the chair. U.S. Pat. No. 5,125,674 discloses a transportable playpen-like structure which includes a seat which can be deployed in the playpen. Presumably, the playpen could also be used as a receptacle for other items when the seat is not used.

U.S. Pat. No. 5,290,049 discloses a stroller including a container for retaining additional items. The structure is partly collapsible for storage, but in use, the stroller seat is always deployed. A different type of stroller is disclosed in U.S. Pat. No. 4,984,813 which can comprise a shopping cart when an infant seat is folded out of the way, and can comprise a stroller when the infant seat is folded horizontally over the container portion. Finally, U.S. Pat. No. 5,090,724 discloses an upright shopping cart which can include an internal seat for a child, and therefore comprise a type of stroller when the seat is deployed.

While the prior art discloses various types of strollers and/or shopping carts, none of the prior art discloses a simple, substantial stroller which is readily convertible into a shopping cart without either significant revision and folding of the structure, or formation of the structure in a manner inconvenient for use as a stroller. Also, because of the nature of the structures of the prior art, users are unaccustomed to their rather strange sizes and shapes, which detract from their acceptance by those intended to use them. There is therefore a need in the market for a conventional type of stroller which is readily convertible into a shopping cart when the stroller function is no longer needed.

SUMMARY OF THE INVENTION

The invention provides a readily usable and convenient, convertible stroller and shopping cart combination. It includes a stroller portion and a shopping cart portion. The stroller portion includes a frame carried by a plurality of wheels, a seat secured to the frame, and means for guiding movement of the stroller portion as it is used. The shopping cart portion comprises a collapsible receptacle. Means is provided for deploying the receptacle from a stowed orientation adjacent the seat to a deployed orientation over the seat.

In accordance with the preferred form of the invention, the deploying means comprises a pivotal bar, with the collapsible receptacle being secured to the bar. The bar is generally U-shaped, and the invention includes a hinge for the bar which is secured to the stroller frame. The hinge comprises a horizontal tube and extensions of the bar which are engaged in the tube for pivoting purposes.

Means is provided for retaining the bar with the receptacle in the deployed orientation. The frame includes an upright handle tube, and the retaining means comprises a stay which extends between the handle tube and the bar. Preferably, the stay comprises a flexible wire.

The receptacle, in the deployed orientation, conforms to the seat of the stroller. In accordance with the preferred form of the invention, the receptacle comprises an open mesh, bag-like structure which can contain articles when deployed, but which collapses readily when folded into the stowed orientation.

BRIEF DESCRIPTION OF THE DRAWINGS

The invention is described in greater detail in the following description of an example embodying the best mode of the invention, taken in conjunction with the drawing figures, in which.

DESCRIPTION OF AN EXAMPLE EMBODYING THE BEST MODE OF THE INVENTION

Figure 1:
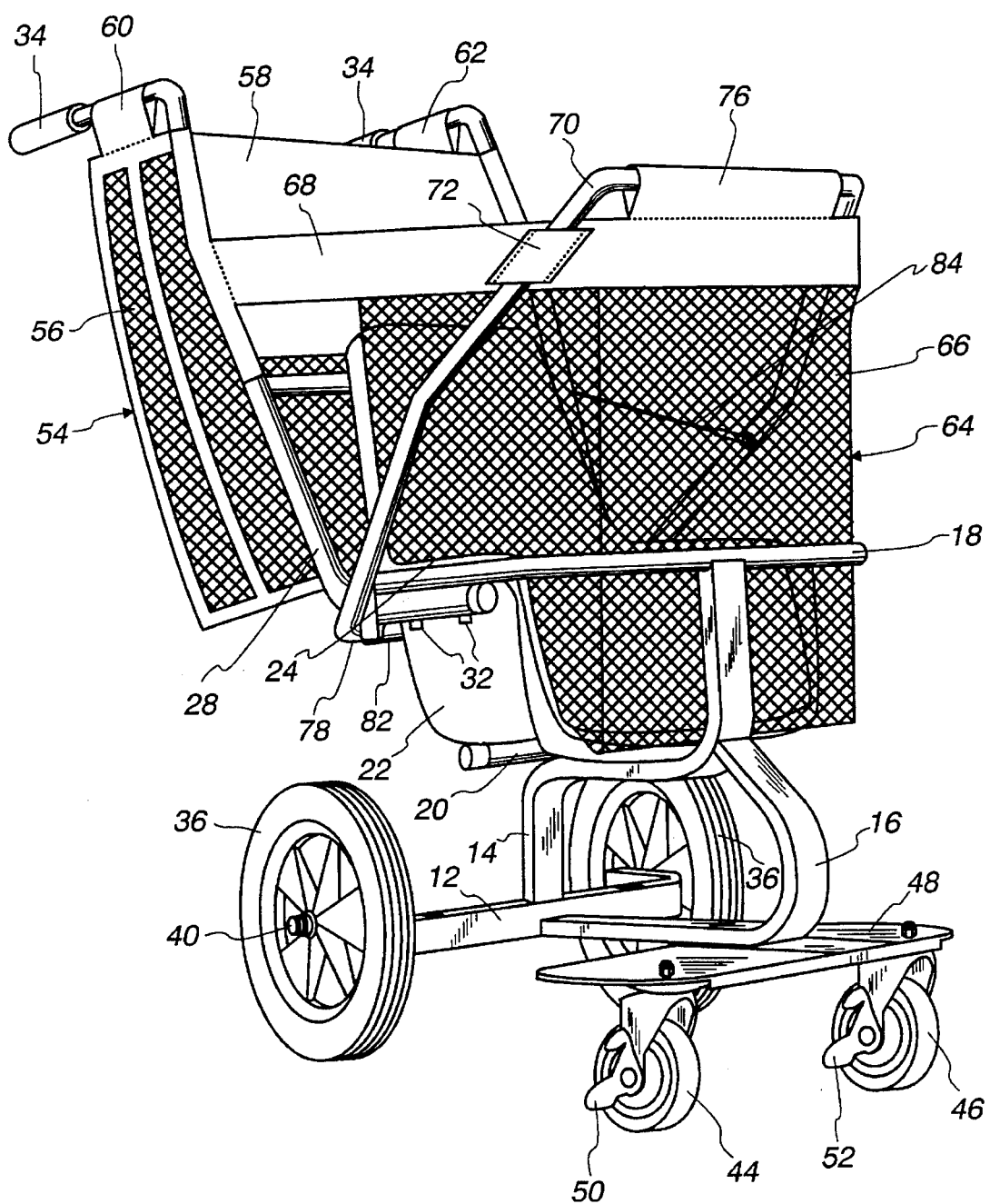
FIG. 1 is a perspective view of the convertible stroller and shopping cart according to the invention, with the shopping cart portion being illustrated in the deployed orientation with the shopping cart receptacle extending over the stroller seat.

A convertible stroller and shopping cart, according to the invention, is designated generally at 10 in the drawing figures. The stroller portion of the invention comprises a series of frame members 12, 14, 16, 18 and 20 which are joined in any conventional fashion, and which preferably are formed of metal or the like. When joined, the frame members 12 through 20 form a frame for the stroller and shopping cart 10.

A seat 22, preferably molded from plastic, is appropriately secured to the frame members 14 and 20. Preferably, the seat is rigidly secured to the frame so that it cannot be readily removed and does not move in relation to the frame members 12 through 20 when the stroller portion of the stroller and shopping cart 10 is used.

The frame member 18 is generally U-shaped, and extends beneath opposite arm rests 24 and 26 which form part of the seat 22. A pair of handle tubes 28 and 30 have portions which extend beneath the frame member 18, and a series of bolts 32 or the like are utilized to firmly connect the frame member 18 to the respective arms 24 and 26 and handle tubes 28 and 30. The handle tubes may, as shown, be capped by appropriate handles 34 for comfort in guiding movement of the stroller and shopping cart 10.

Large, fixed wheels 36 and 38 are secured by appropriate respective central axles 40 and 42 to the frame member 12. The wheels 36 and 38 may rotate about their respective axles 38 and 40, but cannot otherwise move relative to the frame member 12. Similarly, a pair of smaller, caster wheels 44 and 46 are pivotally secured to the underside of a foot plate 48 which is secured to the frame member 16. The wheels 44 and 46 may readily pivot about vertical axis, thus permitting easy guiding of the stroller and shopping cart 10 when it is used. Either or both of the caster wheels 44 and 46 can include an appropriate respective butterfly lock 50 and 52 for locking the wheels 44 and 46 to prevent rotational movement, in a conventional fashion.

Whether the combined stroller and shopping cart 10 is used as stroller or a shopping cart, it can include an auxiliary receptacle 54. The receptacle 54 is composed of a mesh bag 56 which is secured to the upright handle tubes 28 and 30 by means of a horizontal fabric member 58 and a pair of opposite fabric hanging supports 60 and 62. The auxiliary receptacle 54, which forms no part of the invention, can be made and installed in a conventional fashion.

Figure 2:
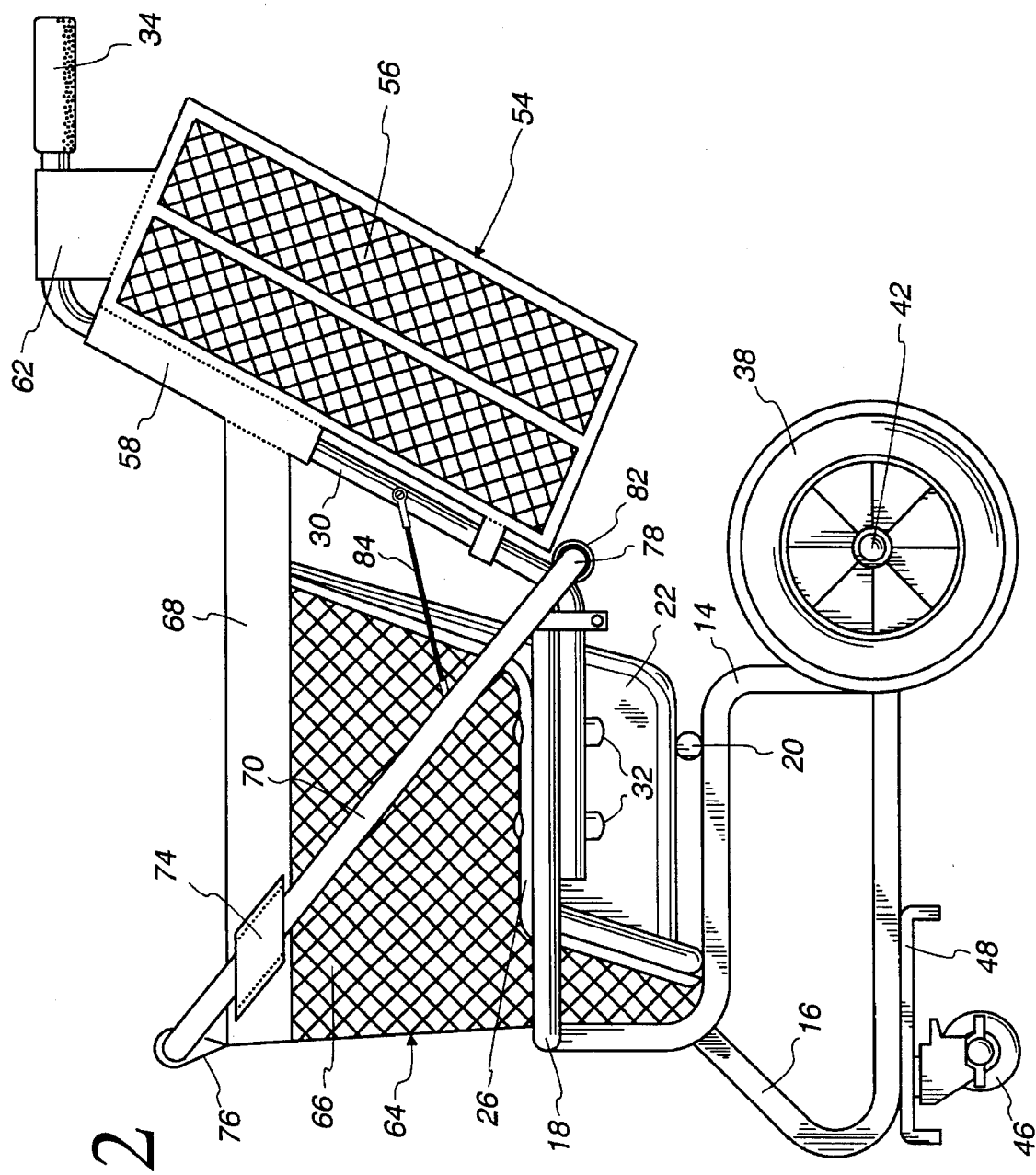
FIG. 2 is a side elevational illustration of the left side of the convertible stroller and shopping cart according to the invention (when taken from the perspective of the person pushing the cart or an infant seated in the stroller), again with the shopping cart portion in the deployed orientation.
Figure 3:
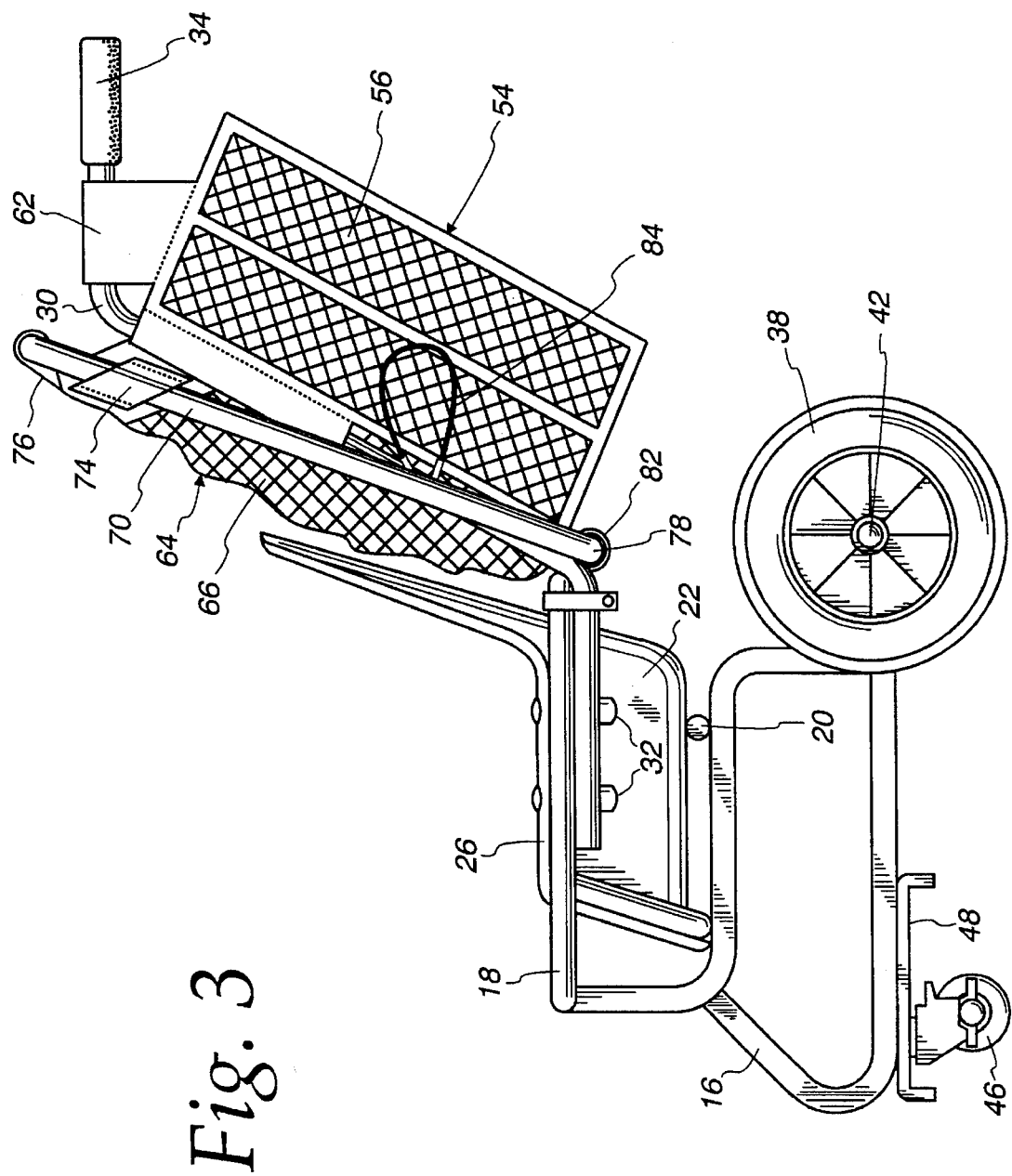
FIG. 3 is a view similar to FIG. 2, but with the shopping cart portion collapsed into the stowed orientation adjacent to the seat so that the stroller can be used for that purpose.

The shopping cart portion of the invention comprises a collapsible receptacle 64. As illustrated in the drawing figures, the collapsible receptacle 64 comprises a mesh bag 66 topped by a fabric collar 68. The collar 68 is secured to a pivotal bar 70 by means of opposite fabric sleeves 72 and 74, and a fabric hanging support 76. The bar 70 is generally U-shaped, and is hingedly secured to the handle tubes 28 and 30. As best shown in FIGS. 2 and 3, the bar 70 includes opposite extensions 78 and 80 which are engaged in a horizontal tube 82 welded or otherwise appropriately secured to the handle tubes 28 and 30. The tube 82 can be a single tubular member extending between the upright handle tubes 28 and 30, or can be individual tubes, one of which is secured to the handle tube 28 and the other of which is secured to the handle tube 30.

To limit forward excursion of the bar 70 when it is used to deploy the receptacle 64, a stay 84 extends between the bar 70 and the handle tube 30. While the stay 84 can take on many different forms, preferably it is comprised of a flexible wire which is appropriately secured to the pivotal bar 70 and the handle tube 30, such as by metal screws. When the collapsible receptacle 64 is folded into the stowed orientation shown in FIG. 3, the stay 84 then drapes between the bar 70 and the upright handled tube 30. Also, although only a single stay 84 is illustrated, more than one stay can be employed, as needed, in order to properly retain the bar 70 in its orientation to hold the collapsible receptacle 64 in the deployed orientation shown in FIGS. 1 and 2.

In use as a stroller, the combined stroller and shopping cart 10 is used as illustrated in FIG. 3. The pivotal bar 70 is pivoted to the stowed orientation depicted, with the mesh bag 66 collapsed behind the seat 22.

When, however, the stroller function of the combined stroller and shopping cart 10 is not needed, the pivotal bar 70 is pivoted forward over the seat 22 to the orientation shown in FIGS. 1 and 2. This deploys the collapsible receptacle 64 with the mesh bag 66 over the seat 22 and conforming thereto. Then, the combined stroller and shopping cart can be used solely as a shopping cart, with both the auxiliary receptacle 54 and the collapsible receptacle 64 being used for carrying of articles.

Various changes can be made to the invention without departing from the spirit thereof or scope of the following claims.

What is claimed is:

1. A convertible stroller and shopping cart, comprising:
   a) a stroller portion and a shopping cart portion,
   b) said stroller portion including a frame supported by a plurality of wheels, a seat rigidly secured to said frame, said seat including a bottom portion, a back portion, and a pair of side portions, and including a safety bar having a transverse portion extending across a forward part of said seat, and a handle assembly secured to said frame and located rearwardly of said back portion, and
   c) said shopping cart portion comprising a collapsible receptacle including a pivotal bar connected to said frame, said pivotal bar having a transverse portion, and a bag formed of flexible material secured to said pivotal bar, said receptacle being movable between a deployed position with said pivotal bar pivoted away from said handle and said bag being located substantially within a boundary formed by the back, bottom, and side portions of said seat and said safety bar to form an open bag and with the transverse portion of the pivotal bar being located above the transverse portion of the safety bar, and a collapsed position with said pivotal bar lying against said handle assembly and said bag extending between said handle assembly and said back portion of said seat.

2. A convertible stroller and shopping cart according to claim 1 in which said pivotal bar is generally U-shaped, and including a hinge for said bar secured to said frame.

3. A convertible stroller and shopping cart according to claim 2 in which said hinge comprises a horizontal tube and an extension of said pivotal bar engaged in said tube.

4. A convertible stroller and shopping cart according to claim 1 including means for retaining said pivotal bar with said receptacle in the deployed orientation.

5. A convertible stroller and shopping cart according to claim 4 in which said frame includes an upright handle tube, and said retaining means comprises a stay extending between said handle tube and said pivotal bar.

6. A convertible stroller and shopping cart according to claim 5 in which said stay comprises a flexible wire.

7. A convertible stroller and shopping cart according to claim 1 in which said receptacle comprises an open mesh bag.

\* \* \* \* \*